(12) United States Patent
Spiegel

(10) Patent No.: US 6,946,103 B1
(45) Date of Patent: Sep. 20, 2005

(54) AIR PURIFIER WITH ELECTRODE ASSEMBLY INSERTION LOCK

(75) Inventor: Peter Spiegel, Los Angeles, CA (US)

(73) Assignee: Sylmark Holdings Limited, (IE)

( * ) Notice: Subject to any disclaimer, the term of this patent is extended or adjusted under 35 U.S.C. 154(b) by 0 days.

(21) Appl. No.: 10/858,952

(22) Filed: Jun. 1, 2004

(51) Int. Cl.[7] .............................................. B01J 19/08
(52) U.S. Cl. .................. 422/186; 422/186.04; 454/370
(58) Field of Search ......................... 422/186.04, 186; 454/370

(56) References Cited

U.S. PATENT DOCUMENTS

| | | | | |
|---|---|---|---|---|
| 2,252,694 | A | 8/1941 | Bennett | 315/58 |
| 2,279,583 | A | 4/1942 | Slayter | 422/186.04 |
| 4,227,894 | A | 10/1980 | Proynoff | 96/58 |
| 4,231,766 | A | 11/1980 | Spurgin | 96/79 |
| 4,689,056 | A | 8/1987 | Noguchi et al. | 96/79 |
| 4,789,801 | A | 12/1988 | Lee | 310/308 |
| 6,163,098 | A | 12/2000 | Taylor et al. | 310/308 |
| 6,312,507 | B1 | 11/2001 | Taylor et al. | 96/19 |
| 6,350,417 | B1 | 2/2002 | Lau et al. | 422/186.04 |
| 6,544,485 | B1 | 4/2003 | Taylor | 422/186.04 |
| 6,632,407 | B1 | 10/2003 | Lau et al. | 422/186 |
| 6,709,484 | B2 | 3/2004 | Lau et al. | 95/76 |
| 6,713,026 | B2 | 3/2004 | Taylor et al. | 422/186.04 |
| 2001/0032544 | A1 | 10/2001 | Taylor et al. | 96/19 |
| 2001/0048906 | A1 | 12/2001 | Lau et al. | 422/186 |
| 2002/0079212 | A1 | 6/2002 | Taylor et al. | 204/164 |
| 2002/0098130 | A1 | 7/2002 | Fong | 422/186.04 |
| 2002/0098131 | A1 | 7/2002 | Taylor et al. | 422/186.04 |
| 2002/0122751 | A1 | 9/2002 | Sinaiko et al. | 422/186 |
| 2002/0122752 | A1 | 9/2002 | Taylor et al. | 422/186 |
| 2002/0127156 | A1 | 9/2002 | Taylor | 422/186 |
| 2002/0134664 | A1 | 9/2002 | Taylor et al. | 204/164 |
| 2002/0134665 | A1 | 9/2002 | Taylor et al. | 204/164 |
| 2002/0146356 | A1 | 10/2002 | Sinaiko et al. | 422/186.04 |
| 2002/0150520 | A1 | 10/2002 | Taylor et al. | 422/186.04 |
| 2002/0155041 | A1 | 10/2002 | McKinney, Jr. et al. | 422/186.04 |
| 2003/0072697 | A1 | 4/2003 | Taylor | 422/186.07 |
| 2003/0106787 | A1 * | 6/2003 | Santilli | 204/164 |
| 2003/0147783 | A1 | 8/2003 | Taylor | 422/186.3 |
| 2003/0147785 | A1 | 8/2003 | Joannou | 422/186.04 |
| 2003/0147786 | A1 | 8/2003 | Taylor | 422/186.04 |
| 2003/0159918 | A1 | 8/2003 | Taylor | 204/164 |
| 2003/0165410 | A1 | 9/2003 | Taylor | 422/186.04 |
| 2003/0170150 | A1 | 9/2003 | Lau et al. | 422/186 |
| 2003/0206837 | A1 | 11/2003 | Taylor et al. | 422/186 |
| 2003/0206839 | A1 | 11/2003 | Taylor et al. | 422/186.04 |
| 2003/0206840 | A1 | 11/2003 | Taylor et al. | 422/186.04 |
| 2003/0209420 | A1 | 11/2003 | Taylor et al. | 204/164 |
| 2003/0233935 | A1 | 12/2003 | Reeves et al. | 95/76 |
| 2004/0003721 | A1 | 1/2004 | Lau et al. | 96/15 |
| 2004/0018126 | A1 | 1/2004 | Lau et al. | 422/186.04 |
| 2004/0033176 | A1 | 2/2004 | Lee et al. | 422/186 |
| 2004/0033340 | A1 | 2/2004 | Lau et al. | 428/137 |
| 2004/0047775 | A1 | 3/2004 | Lau et al. | 422/186.04 |
| 2004/0052700 | A1 | 3/2004 | Kotlyar et al. | 422/186.04 |
| 2004/0057882 | A1 | 3/2004 | Lau et al. | 422/186.04 |
| 2004/0079233 | A1 | 4/2004 | Lau et al. | 96/51 |
| 2004/0096376 | A1 | 5/2004 | Taylor et al. | 422/186.07 |

* cited by examiner

Primary Examiner—Steven Versteeg
(74) Attorney, Agent, or Firm—Kathy Mojibi Kavcioglu

(57) ABSTRACT

An air purifier device with an electrode assembly insertion lock comprises a housing, a removable electrode assembly, and a gravity-operated lock which prevents the removable electrode assembly from being inserted into the housing while the housing is in a vertical orientation, thereby preventing the electrode assembly from free-falling within the housing during insertion into the opening.

18 Claims, 4 Drawing Sheets

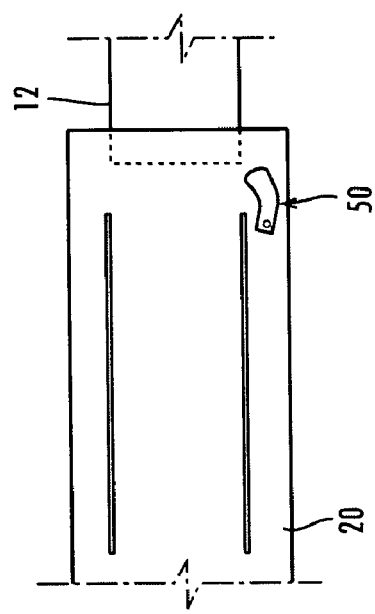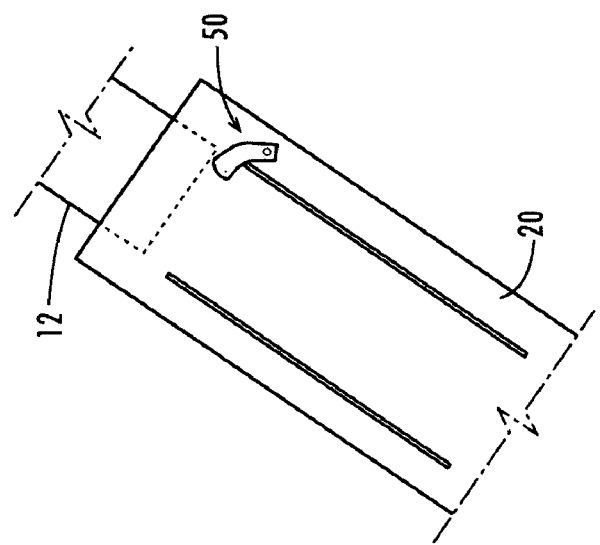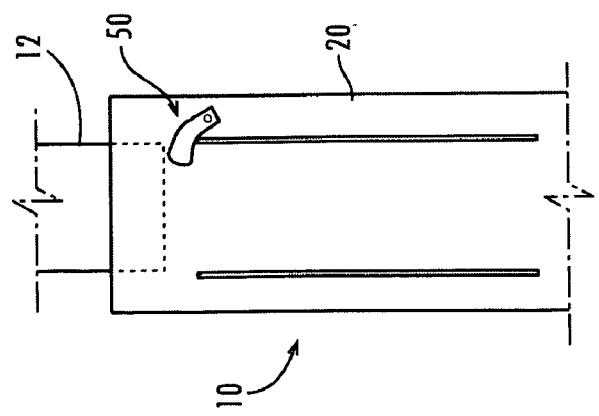

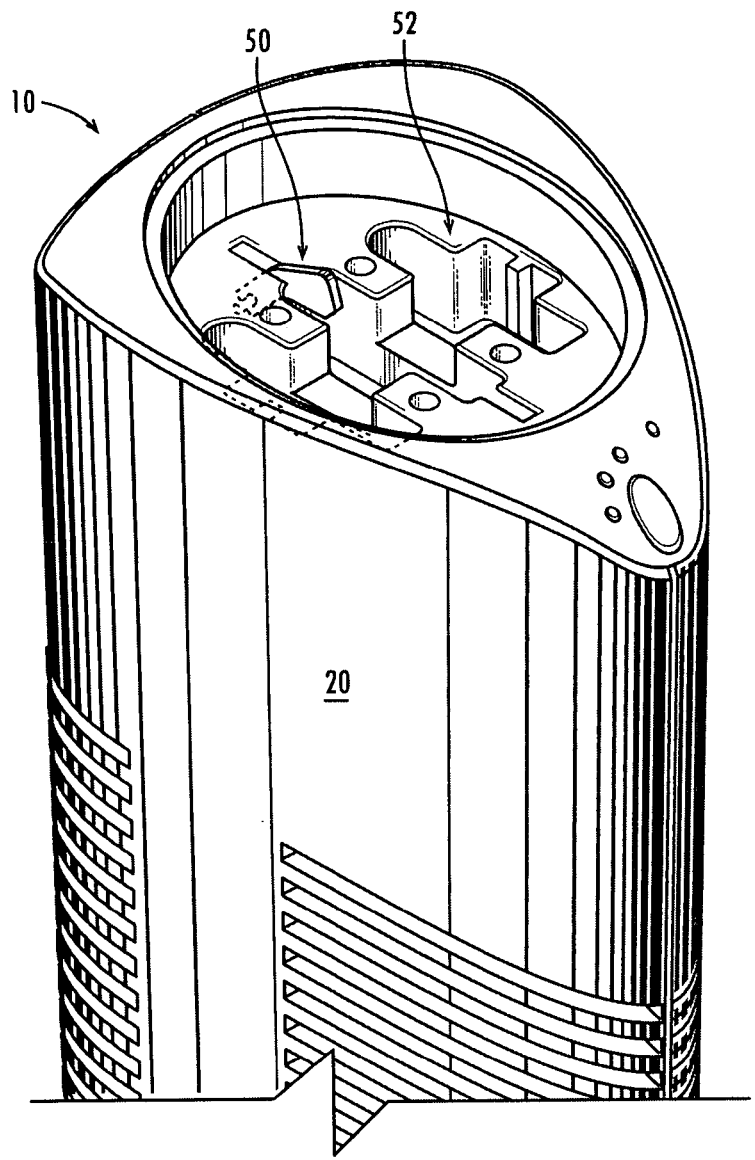
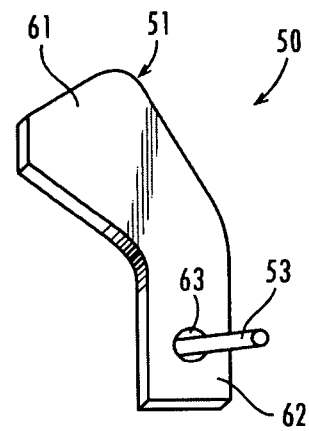
Fig. 4
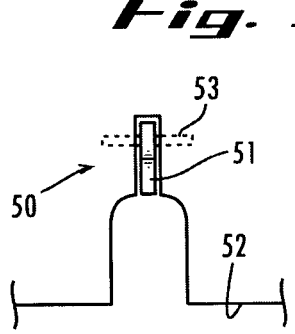
Fig. 3
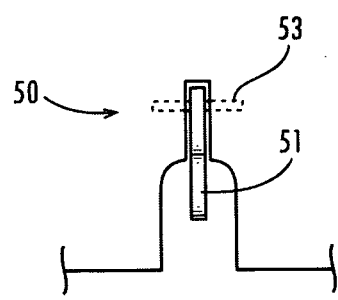
Fig. 5A    Fig. 5B

AIR PURIFIER WITH ELECTRODE ASSEMBLY INSERTION LOCK

TECHNICAL FIELD

This invention relates generally to an air purifier device and, more particularly, to an air purifier device with an insertion lock for an electrode assembly.

BACKGROUND OF THE INVENTION

It is known that electro-kinetic techniques can produce air flow, by which electrical power is directly converted into a flow of air without use of mechanically moving parts. These electro-kinetic techniques have been used to design air purifiers. Various embodiments of such air purifying systems have been constructed. One such system is schematically depicted herein in simplified form as FIG. 1. Another example of an air purifier can be found in U.S. Pat. No. 6,713,026.

Air purifiers of this type often include a louvered or grilled body that houses an ionizer unit. The ionizer unit can include electrical components which provide the desired power for the air purifier. The air purifiers typically also include electrodes, for example, comprising first and second spaced-apart arrays of conducting electrodes, the first array and second array being coupled, respectively, preferably to the positive and negative output ports of a power source.

The first electrode array typically comprises wire-like electrodes, and the second array typically comprises plate-shaped electrodes. The electrode assembly can comprise various combinations of the first and second arrays of electrodes.

An electric field is generated between the first and second electrode arrays. This field produces an electro-kinetic airflow going from the first array toward the second array, the airflow being rich in preferably a net surplus of negative ions and in ozone. Ambient air, including dust particles and other undesired components, enters the housing through the grill or louver openings, and ionized clean air exits through openings on the downstream side of the housing.

Particulate matter in the air is entrained within the airflow and moves towards the electrodes. Much of the particulate matter is electrostatically attracted to the surface of the second (collector) electrode array, where it remains, thus conditioning the flow of air exiting the system. Also, the high voltage field present between electrode arrays can release ozone into the ambient environment, which may destroy or at least alter whatever is entrained in the airflow, including, for example, bacteria, and can eliminate odors in the output air.

Such ionic air purifiers typically require periodic cleaning of the electrodes in order to dispose of collected particles and restore surface area to collect new particles and, thus, maintain its air purifying ability. This can be done in various ways. Commonly, the electrode assembly is removed and wiped clean. The removal and reinsertion process can damage the electrodes if they are knocked around and/or dropped. U.S. Pat. No. 6,713,026, described briefly above, describes (at least in the claims thereof) cleaning the electrode plates by lifting the electrode plates vertically out through an opening in the top of the housing, cleaning the removed electrode plates, and then inserting the cleaned plates through the opening in the top of the housing. This is accomplished with the housing held in a vertical orientation, with the result being that as the electrode plate assembly is inserted, gravity assists in pulling the electrode plate assembly down into the housing. Unfortunately, if the user lets go of the electrode plate assembly during insertion, the electrode plate assembly can free-fall until it hits bottom, increasing the risk of damage to the electrode plate assembly or the electrical components within the housing.

Consequently, there is a need for an improved purifier with a mechanism for controlling the replacement of the electrode plate assembly upon which dust and other particles collect to minimize the risk of damage to the electrode plate assembly (and the rest of the air purifier) during insertion of the electrode plate assembly. It is to the provision of such an air purifier that the present invention is primarily directed.

SUMMARY OF THE INVENTION

Briefly described, in a preferred form the present invention comprises an air purifier including a housing with an opening, a removable electrode plate assembly for insertion into and removal from the opening in the housing, and a lock which prevents the removable electrode plate assembly from free-falling into the housing during insertion into the housing.

Preferably, the lock prevents insertion of the electrode plate assembly into the opening when the housing is substantially vertical. Optionally, the lock can be gravity operated. The lock can be positioned adjacent the opening and comprise an asymmetric movable element pivotally mounted to the housing for movement between a blocking position and a non-blocking position. In one form, the lock can be an asymmetric body that trips or triggers at a desired angle when its center of gravity moves from one side of a pivot axle to another side.

In a preferred embodiment, the opening of the housing optionally is asymmetric and the removable electrode assembly has a matching asymmetric shape such that the removable electrode assembly can only be inserted into the opening in one orientation.

In a preferred embodiment, the housing optionally includes internal guide surfaces for closely guiding the removable electrode assembly during insertion into the housing. Preferably, the internal guide surfaces generate friction against the movement of the electrode plate assembly to prevent free-falling of the electrode plate assembly during insertion.

In operation, when the removable electrode plate assembly is to be inserted, the lock prevents insertion of the removable electrode plate assembly into the opening when the housing is substantially vertical. In a preferred embodiment, the lock allows insertion of the removable electrode plate assembly only when a top portion of the housing is not substantially higher than a bottom portion of the housing. The lock is operative to prevent insertion of the removable electrode plate assembly when the housing is above a predetermined angle above horizontal. This angle can be designed to be quite near horizontal. For example, the angle can be about 10° above horizontal. Optionally, the angle can be about 45° above horizontal. The particular angle at which the lock is triggered can be chosen as desired. However, it should be chosen to assist in preventing the electrode plate assembly from free-falling during insertion.

BRIEF DESCRIPTIONS OF THE DRAWINGS

FIG. 1 is a perspective view of a prior art ionic air purification device comprising a housing and an electrode assembly.

FIGS. 2A–C depict an air purifier device according to a preferred form of the invention, and are cross-sectional views of the invention showing the device at different angular attitudes. In particular, FIG. 2A shows the device upright, with the lock in a locked position; FIG. 2B shows the device tilted over at about a 45 degree angle, with the lock in an intermediate position where it is still locked at an angle; and FIG. 2C shows the device in a horizontal position, with the lock in an unlocked position.

FIG. 3 is a perspective view of the top of the air purifier device of FIGS. 2A–C, in particular showing the lock and a keyed opening portion of the device.

FIG. 4 is a detailed view of the lock of FIGS. 2A–C.

FIGS. 5A–B are detailed views of the lock of FIGS. 2A–C, shown in its open and locked positions, respectively. FIG. 5A shows a detail of the lock allowing access to the housing opening. FIG. 5B shows a detail of the lock creating an impediment in the housing opening.

Figure 6:
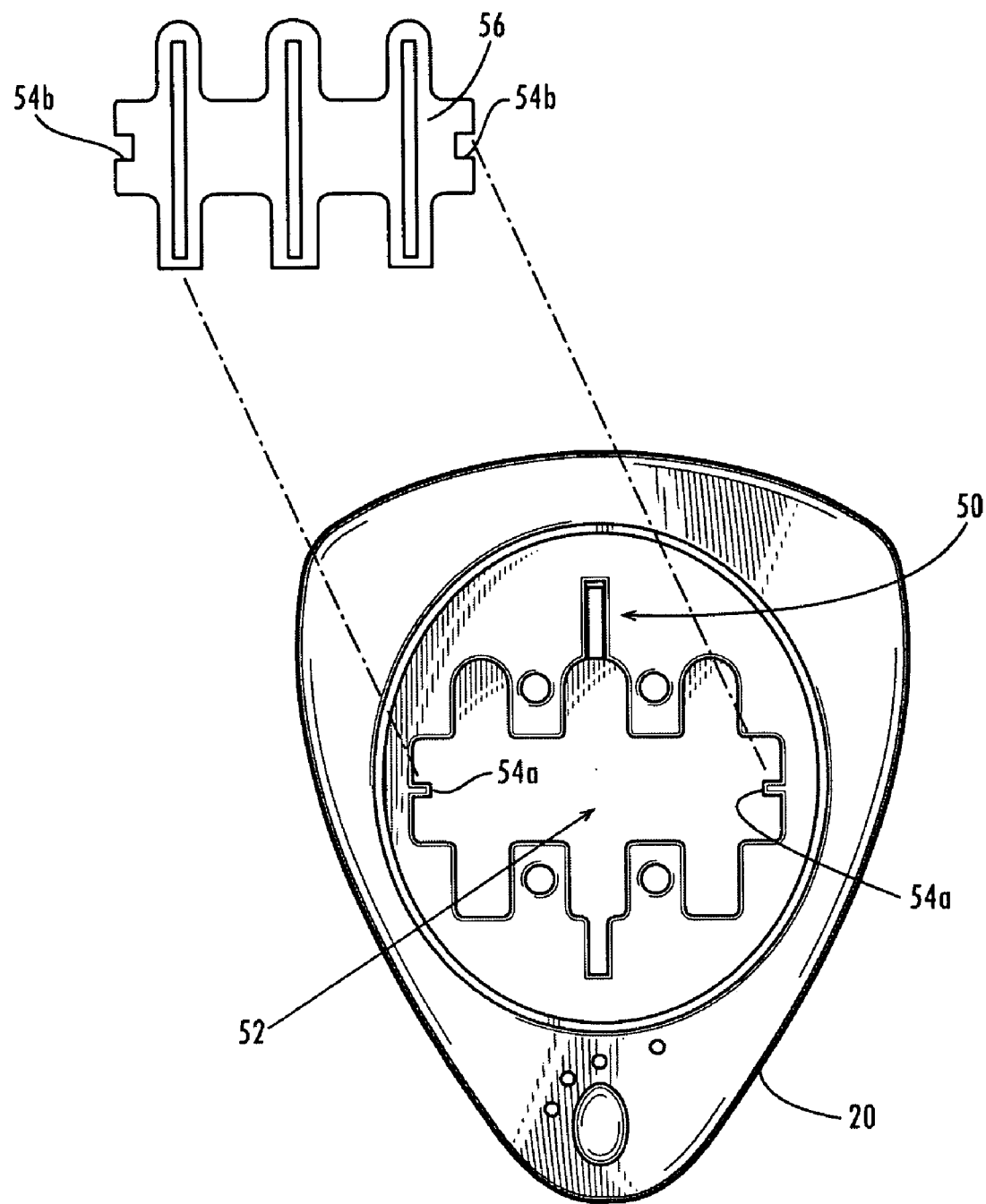

FIG. 6 is a detailed view of the air purifier device of FIGS. 2A–C, and shows a detail of rails portions of the device from a horizontal view of the top of the device.

DETAILED DESCRIPTION OF THE PREFERRED EMBODIMENTS

Figure 1:
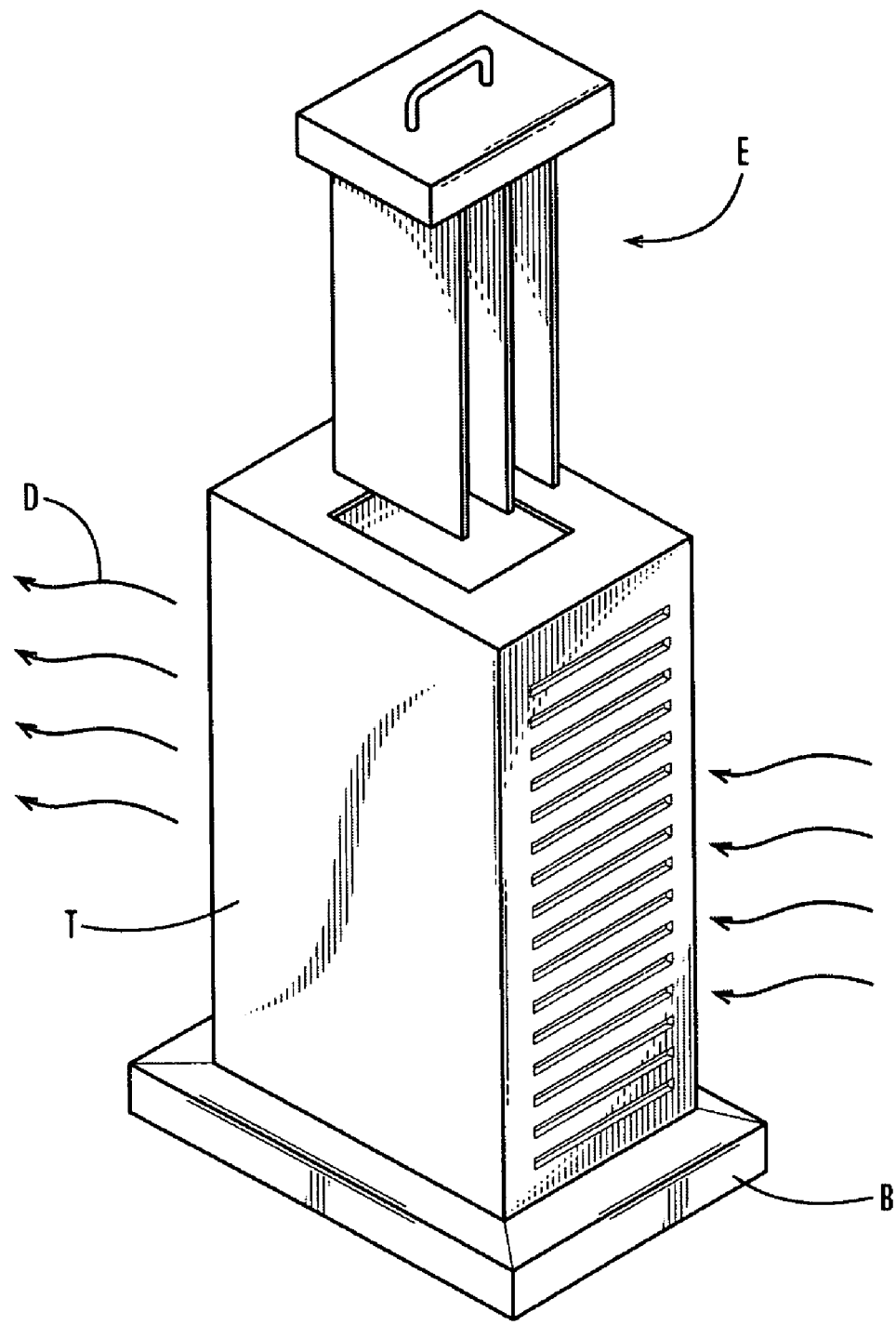

Referring now to the drawing figures, wherein like reference numerals represent like parts throughout the several views, FIG. 1 shows a prior art ionic air purifier device. The prior art ionic air purifier device shown in FIG. 1 is intended to be schematic in form in that it does not represent the particular look of any particular prior art device. However, it shares common features with many prior art devices of this type. First, it has a base B, an upright tower T, the tower is louvered or slatted, and it has a removable electrode plate assembly E. The air purifier device, as shown, is a tower-style ionic air purifier device that uses ionic forces to move and clean air. Such a device uses electrical energy to generate electrostatic forces, which create air flow without the use of moving parts. Electrostatic forces also enable the purifier to collect airborne contaminants, such as dust, pet dander and other small particles, on three collector plate electrodes. The electrostatic forces are generated by two arrays of electrodes excited by high-voltage. A simple electronic circuit for operating the device is employed (typically).

As is common in such devices, a first electrode array comprises a plurality of wire or rod-shaped electrodes, which are coupled using a common bus to a positive terminal of a high-voltage generator. The second electrode array comprises a corresponding number of solid collector plate electrodes. The high-voltage generator creates an electrical charge between the electrode arrays. The resulting ionic forces create a silent movement of air in the direction of direction arrows D.

As shown in FIG. 1, the plate electrodes of the second electrode array can be removed for cleaning, and then the cleaned plate electrodes can be reinserted into the housing for use. The plate electrodes are removed from the housing vertically through its top. In the prior art, it is common to insert the heavy, metal electrode plates vertically through the top of the housing, allowing them to free-fall by the force of gravity during reinsertion into the housing. Such free-falling could damage the electrodes, the housing, or other components of the device.

As shown in FIGS. 2A–6, the present invention comprises an air purifier device 10 which includes a housing 20 and an insertion lock 50 that controls reinsertion of the electrode plate assembly 12 to prevent such free-falling. The housing 20 can be of any design and in particular can be a tower-style housing. Optionally, the housing 20 can be provided with a pedestal base (unshown). The housing 20 includes a shaped opening 52 (which is an upper opening when the housing is vertical and is a lateral opening when the housing is horizontal). The insertion lock 50 is positioned adjacent the opening 52 in the housing 20. The insertion lock 50 comprises an asymmetric movable element 51 pivotally mounted to the housing 20 (using a pivot axle 53) for pivotal movement between a blocking position extending within the opening 52 (FIGS. 2A, 2B, 3 and 5B) and a non-blocking position retracted from the opening (FIGS. 2B and 5A).

When the housing 20 is vertical (FIG. 2A) or tilted to about 45 degrees (FIG. 2B), for example, the insertion lock 50 is positioned in the blocking position under the force of gravity, thereby blocking the opening 52 so that the electrodes 12 cannot be reinserted. When the housing 20 is tilted down to horizontal (FIG. 2C), the insertion lock 50 pivots (in the clockwise direction shown) under the force of gravity to the non-blocking position, thereby unblocking the opening 52 so that the electrodes 12 can be reinserted. Now the electrodes 12 can be reinserted into the housing 20 by manually pushing them laterally against the frictional forces created by gravity acting on the mass of the electrodes. That is, the electrodes are reinserted into the housing with gravity acting against the reinsertion, not assisting it. With the housing 20 tilted down to horizontal or just above horizontal at about 10 degrees, the electrodes cannot free-fall into the housing.

As best seen in FIG. 4, the movable element 51 is a plate-like device having a shape not unlike a "dog leg," with the upper portion 61 of the dog leg being broader (and hence more massive) than the lower portion 62. The lower portion 62 includes an axle bore 63 for receiving the axle 53 therein. This construction makes the movable element 51 rather top-heavy. The top-heaviness of the movable element is taken advantage of to cause it to trip one way or another, depending on whether the center of gravity is then positioned to the left or the right of the pivot axle 53. As can be appreciated from looking at FIG. 4, the center of gravity of the movable element 51 is above the pivot axle 53. Referring next to FIGS. 2A–2C, one can see how this is used to trigger the lock.

With the housing in the vertical orientation of FIG. 2A, the center of gravity of the movable element 51 is to the left of the pivot axle, causing it to fall to the left (counter-clockwise direction in this view). This pulls the movable element down against an upper edge of one of the internal guide surfaces, against which it rests. In this position, the movable element 51 is partially in the opening of the housing, thereby blocking the path of the electrode plate assembly 12 and preventing reinsertion.

With the housing in the 45 degree orientation of FIG. 2B, the center of gravity of the movable element 51 is still positioned to the left of the pivot axle, still causing it to fall to the left (counter-clockwise direction in this view). This continues to pull the movable element down against an upper edge of one of the internal guide surfaces, against which it rests. In this position, the movable element 51 remains partially in the opening of the housing, thereby blocking the path of the electrode plate assembly 12 and preventing reinsertion.

With the housing in the horizontal orientation of FIG. 2C, the center of gravity of the movable element 51 is now to the right of the pivot axle, causing it to fall to the right (clockwise direction in this view). This pulls the movable element away from the opening of the housing, thereby unblocking the path of the electrode plate assembly 12 and allowing reinsertion.

As shown in FIG. 6, the air purifier 10 optionally further includes first and second guide surfaces 54a and 54b for closely guiding the removable electrode plate assembly 12 during reinsertion into the housing. The first guide surfaces 54a extend inwardly from the housing 20 and along a substantial internal height of the housing, while the second guide surfaces 54b are formed on the guide base 56 of the plate electrode assembly 12. The first guide surfaces 54a are closely received in the second guide surfaces 54b with a snug fit so that, even if the housing 20 is tilted back up to vertical after the electrodes 12 are partially reinserted, the electrodes bind securely in place and do not slide down into the housing 20 under the force of gravity (no free-fall).

The air purifier 10 of the present invention optionally can further comprise a keyed opening in the housing 20. In other words, the opening 52 preferably is a keyed opening that is matched to a keyed shape of the electrode plate assembly. The keyed opening aids in ensuring proper orientation of the electrode plate assembly during insertion and removal of the electrode assembly. The keyed opening allows the electrode plate assembly to only be inserted in one (proper) orientation. As shown in the figures, one way of doing this is to make the opening asymmetric. As shown for purposes of providing an example of such, in the figures an opening is shown having a series of finger-like portions, with finger-like portions on one side being rounded at their ends and finger-like portions on the other side being rather squared off. The guide base 56 of the electrode plate assembly 12 has a corresponding shape of rounded finger-like portions and squared off finger-like portions. In this way, the guide base is like a key and the opening is like a keyed opening in that the guide base can only be inserted into the opening in one orientation.

In a preferred embodiment, the keyed opening is asymmetric and the removable electrode assembly has a matching asymmetry (e.g., the spacing caps of the assembly are shaped and sized to pass through the opening) such that the removable electrode assembly can only be inserted into the opening in one orientation. In the preferred embodiment, one side of the opening has rounded contours and the opposite side of the opening has squared contours. One of skill in the art can determine other suitable geometries and sizes for the keyed opening suitable for a particular air purifier device.

It should be noted that the air purifier device can be designed with an insertion lock that pivots to the non-blocking position at a desired predetermined angle, and the particular angle can be fixed by design of the lock. In one embodiment of the invention, the lock was designed such that when the housing is at an angle of a little less than about 45 degrees above horizontal, the lock is triggered. In another embodiment of the invention, as shown in the drawings herein, the lock is triggered when the housing is at a substantially horizontal position. In particular, the insertion lock shown triggers at about 10 degrees above horizontal.

Optionally, the housing 20 in a preferred embodiment can be wedge-shaped or cylindrical with a top, bottom, and sides. In a preferred embodiment, a horizontal cross-section of the housing is roughly triangular with rounded corners. One of skill in the art can appreciate that other shapes are possible.

The housing can be made of plastic (or other materials of choice). The housing can be made in a variety of ways, such as by injection molding.

The sides of the housing allow air to pass through the air purifier. This can be accomplished in a preferred embodiment by slots formed in the sides of the housing. Other styles of openings in the housing which allow air to pass through the device can be used, as desired.

The bottom of the housing can provide an essentially flat base for the air purifier to stand on a floor or other surface. Alternatively, a separate base can be attached or otherwise placed at the bottom of the housing. The shape and size for the base can be any which keeps the air purifier in its desired position (e.g., upright) during general usage conditions.

The air purifier device 10 of the present invention comprises an electrode plate assembly 12, which is removable from the housing 20. Preferably, the electrode plate assembly 12 is relatively rigid and is easy to handle. The electrode plate assembly can have a spacing cap or guide base 56 at the lower end of the plates. The guide base 56 holds the plates in a desired position, as well as eases insertion and removal of the assembly. The guide base 56 can also comprise electrical contacts which conduct energy from the power source or circuitry to the electrodes.

The electrode plate assembly 12 can be cleaned, for example in a preferred embodiment, by removal of the assembly from the device and the particles wiped from the electrodes. The removal of the electrode plate assembly 12 can be accomplished with the housing 20 in any orientation, but can only be inserted when the housing is substantially horizontal.

While the invention has been disclosed in preferred forms, those skilled in the art will recognize that many additions, subtractions, and modifications can be made therein without departing from the spirit and scope of the invention as set forth in the appended claims.

What is claimed is:

1. An air purifier comprising:
a housing with an opening;
a removable electrode assembly for insertion into and removal from the opening; and
a lock which prevents the removable electrode assembly from freefalling within the housing during insertion of the removable electrode assembly into the opening.

2. An air purifier as claimed in claim 1 wherein the lock prevents insertion of the removable electrode assembly into the opening when the housing is substantially vertical.

3. An air purifier as claimed in claim 1 wherein the lock allows insertion of the removable electrode assembly only when a top portion of the housing is not substantially higher than a bottom portion of the housing.

4. An air purifier as claimed in claim 1 wherein the housing includes internal guide surfaces for closely guiding the removable electrode assembly during reinsertion into the housing.

5. An air purifier as claimed in claim 1 wherein the opening is asymmetric and the removable electrode assembly is matchingly asymmetric such that the removable electrode assembly can only be inserted into the opening in one orientation.

6. An air purifier as claimed in claim 1 wherein the lock is operative to prevent insertion of the removable electrode assembly when the housing is more than about 10° above horizontal.

7. An air purifier as claimed in claim 1 wherein the lock is operative to prevent insertion of the removable electrode assembly when the housing is more than about 45° above horizontal.

8. An air purifier as claimed in claim 1 wherein the lock is gravity operated.

9. An air purifier as claimed in claim 8 wherein the lock is positioned adjacent the opening and comprises an asymmetric movable element pivotally mounted to the housing for movement between a blocking position and a nonblocking position.

10. An air purifier device comprising:
a housing with an opening;
a removable electrode assembly for insertion into and removal from the opening;
means for at least partially blocking the opening when the electrode assembly is removed from the housing and the housing is in a substantially vertical position.

11. An air purifier comprising:
a housing with an opening;
a removable electrode assembly for insertion into and removal from the opening; and
a lock which prevents insertion of the removable electrode assembly into the opening when the housing is substantially vertical.

12. An air purifier as claimed in claim 11 wherein the opening is a shaped opening and wherein the removable electrode assembly has a shape which closely matches the shaped opening such that the shaped opening guides the electrode assembly.

13. An air purifier as claimed in claim 12 wherein the shaped opening is a keyed, asymmetric shaped opening and wherein the removable electrode assembly has a corresponding keyed, asymmetric shape which closely matches the shaped opening such that the electrode assembly will only fit in the shaped opening in one orientation.

14. An air purifier as claimed in claim 11 wherein the lock is gravity operated.

15. An air purifier device comprising:
a housing with a shaped opening formed therein;
a removable electrode assembly for insertion into and removal through the opening, wherein the removable electrode assembly is configured to closely match the shaped opening formed in the housing; and
and insertion lock for preventing the removable electrode assembly from being inserted into the shaped opening when the housing is upright.

16. An air purifier device comprising:
a housing with an opening;
a removable electrode assembly for insertion into and removal from the opening;
a lock having a blocking configuration and a nonblocking configuration, wherein in the blocking configuration, the lock at least partially blocks the opening of the housing, and wherein in the nonblocking configuration, the lock does not block the opening.

17. The air purifier device of claim 16 wherein upon the removal of the electrode assembly from the housing, the lock assumes a blocking configuration.

18. The air purifier device of claim 16 wherein the lock assumes a nonblocking configuration when the housing is tilted to a predetermined angle.

* * * * *